Figures 1, 2:
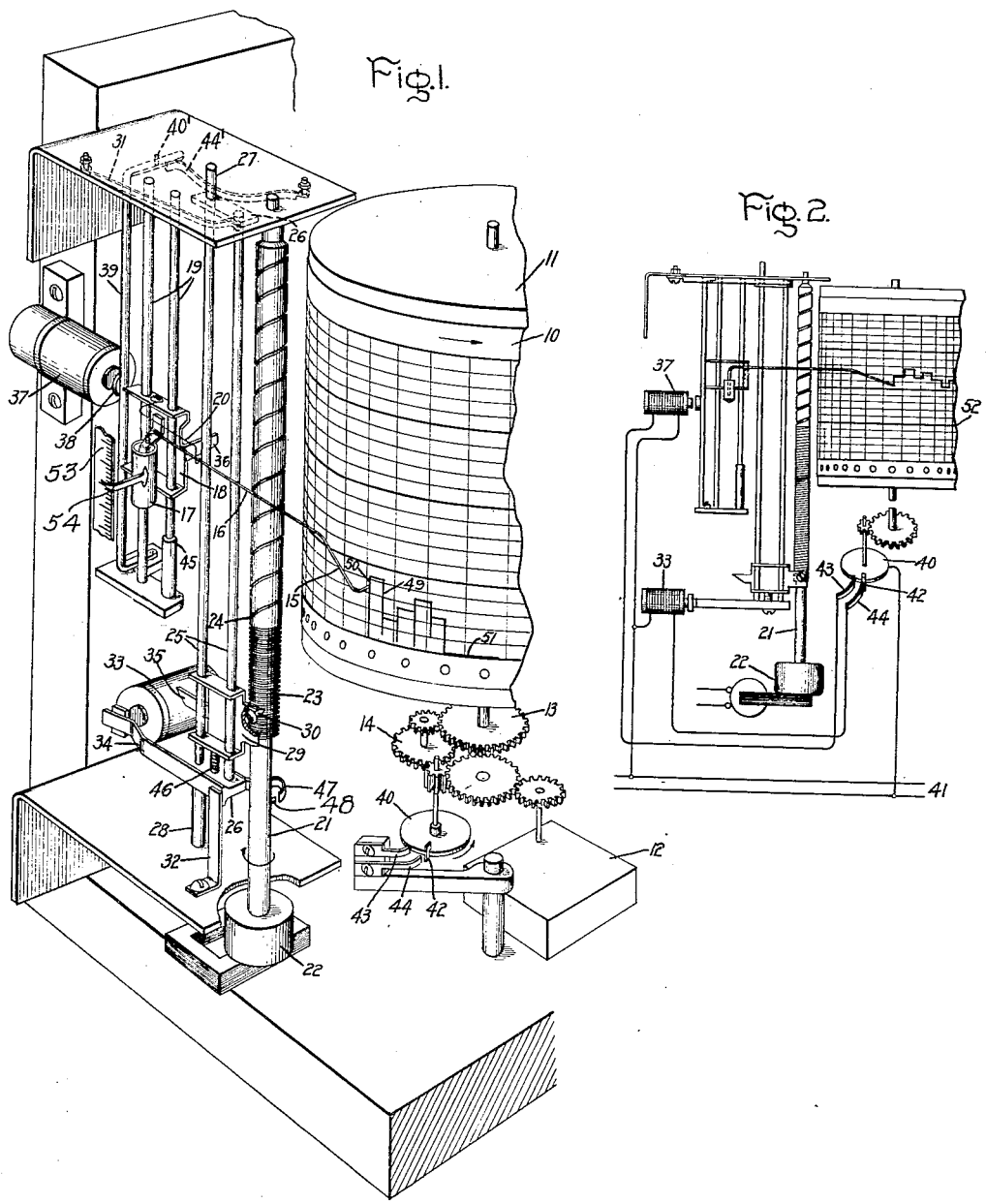

Nov. 11, 1930.  F. S. MARCELLUS  1,781,588

DEMAND METER

Filed June 7, 1926

Inventor:
Fredrick S. Marcellus,
by *Alexander S. [signature]*
His Attorney.

Patented Nov. 11, 1930

1,781,588

UNITED STATES PATENT OFFICE

FREDRICK S. MARCELLUS, OF SCOTIA, NEW YORK, ASSIGNOR TO GENERAL ELECTRIC COMPANY, A CORPORATION OF NEW YORK

DEMAND METER

Application filed June 7, 1926. Serial No. 114,114.

My invention relates to apparatus suitable for indicating or recording or both indicating and recording the integrated demands over predetermined intervals and its primary object is to provide apparatus of the class described in which the important portions of the indication or record is expanded for the sake of clearness without sacrificing accuracy or correspondingly reducing the demand period or increasing the size of the apparatus. The invention is applicable to demand meters generally such for example as those which indicate or record or which accomplish both functions. For the sake of convenience in the specification and claims I may use the term indicating or refer to the apparatus as an indicator, but I desire to have it understood that I will use these or equivalent expressions as meaning devices or apparatus which indicate or record or both.

The usual type of integrating demand apparatus is employed to register the maximum demand. Ordinarily the registration below the maximum or below a predetermined high average registration is seldom used. As a consequence it is seen that the record or registration below that which will ordinarily be reached in a demand period is relatively unimportant and may in most cases be suppressed or dispensed with entirely. I have found that this may be done to a considerable advantage in that the important part of the registration or record may then be expanded for the sake of clearness and accuracy without increasing the size of the apparatus or correspondingly decreasing the demand period. Other improvements applicable to demand registers generally are included in the invention.

In carrying my invention into effect I provide apparatus for moving a demand indicator in such a way that its movement is suppressed or restricted over the unimportant indicating range and is magnified or expanded over the important portion of the indicating range. This may be done for example by providing speed varying means between the indicating apparatus and its actuating means which is arranged to change the speed ratio therebetween as certain demands are reached.

The features of my invention which are believed to be novel and patentable will be pointed out in the claims appended hereto. For a better understanding of my invention, reference is made in the following description to the accompanying drawing in which Fig. 1 illustrates my invention applied to a frequency recorder, and Fig. 2 shows a further modification, together with the electrical connections for the relays used.

Referring to the drawing, 10 represents a recording chart which is advanced in the direction of the arrow over the usual drum 11 from and to the usual supply and rewinding rolls, not shown. A suitable clock, or other timing device 12, advances the drum 11 through its shaft 13 and a reduction gear train 14. A recording pen 15 bears on the chart. The arm 16 which supports the pen is hollow and communicates with an ink well 17. The ink well 17 and recording arm 16 are carried by a carriage 18, hereinafter designated as the indicating carriage, which is adapted to slide up and down on parallel rods 19. A spring 20 causes the pen to bear lightly on the chart at all times.

Suitable motion transmitting means are provided for moving the indicating carriage in accordance with the demand being measured. A shaft 21 is adapted to be rotated at a speed proportional to the demand or other quantity to be recorded. A self starting synchronous motor 22 is here represented as the actuating means for rotating this shaft. The shaft is threaded as shown at 23 and 24. The thread at 23, which is below the recording chart is of a relatively smaller pitch than at 24, which is opposite the chart. This change in pitch changes the motion transmitting ratio as will be explained hereinafter. Adjacent the shaft 21 is a pair of parallel rods 25 carried on a framework 26. This framework is pivoted at 27 and 28 at its top and bottom so that it may be rotated a short distance toward and away from the shaft 21. Slidably mounted on the rods 25 is a carriage 29 hereinafter referred to as the demand carriage, which carries a pointed screw 30 extending through the carriage toward the shaft 21. The framework 26 is adapted to be swung toward the shaft 21 so that the pointed end of the screw 30 fits into the thread on the shaft 21. This is the normal position of these parts and this position is normally maintained by springs 31 and 32 bearing against the upper and bottom ends of the framework. At the end of a demand period the framework 26, together with the demand carriage 29, is adapted to be swung away from shaft 21 so as to remove the screw 30 from the thread on the shaft 21 by means of a relay 33 and an armature lever 34 secured to the bottom of the framework 26.

In Fig. 1 the relay is represented as deenergized so that the springs 31 and 32 maintain the framework 26 rotated toward shaft 21 with the screw 30 in mesh with the thread on the shaft. The direction of rotation of shaft 21 is such as to carry the demand carriage 29 upward. A finger 35 at the rear of this carriage will thus move up under a cooperating finger 36 extending from the rear of the indicating carriage 18 which carries the recording apparatus and moves said recording apparatus upward. Both the demand carriage 29 and the indicating carriage 18 will drop downward by gravity when released. The demand carriages released by the relay 33 as previously explained and the indicating carriage is released by a second relay 37 having an armature 38. The armature 38 is carried by a rod 39 extending parallel with the guide rods 19. The rod 39 is bent to the rear at right angles at its ends and is pivoted on an axis 40' at the top and bottom. When the relay 37 is deenergized, which is the normal condition, a spring 44' causes the rod 39 to bear lightly against the indicating carriage 18, thereby preventing it from falling. However, this pressure of the rod 39 against the indicating carriage 18 does not prevent the latter from being moved upward by the demand carriage 29.

The relays 33 and 37 are normally deenergized but are adapted to be energized in a predetermined sequence at the end of a demand interval so that the indicating carriage is released just before the demand carriage is released. The electric circuits for performing these operations may be as represented in Fig. 2 where a contact disc 40 is operated by the clock train which drives the chart. Disc 40 is electrically connected to one side of a source 41 and one terminal of the relays 33 and 37 is connected to the other side of this source. The disc 40 carries a contact extension 42, which wipes across stationary contacts 43 and 44 as it rotates in the direction indicated by the arrow thereon. Contact 43, which is energized first, completes the energizing circuit of relay 37 and contact 44, which is energized shortly after contact 43 is again deenergized, completes the circuit of relay 33. The gear ratio between disc 40 and the clock train determines the demand interval and may be changed as desired.

The duration of contact at 43 is long enough to allow the indicating carriage to drop down until it is stopped either by the rising demand carriage or by the stop 45 at the bottom of its recording position and the duration of contact at 44 is long enough to allow the demand carriage to drop back to its zero or initial position against a stop 46. The stop 46 is an adjustable screw so that this position of the demand carriage may be accurately adjusted. It will be observed that the beginning of a demand interval is when the relay 33 is deenergized and the screw 30 meshes with the thread on shaft 21. In order that this screw may always be in exactly the same position with respect to the thread when the relay 33 is deenergized, I prefer to momentarily stop the shaft in exactly the same position each time just prior to the beginning of a demand interval. This is done while the demand carriage is dropping to its zero position by means of a finger 47 which as carried by the framework 26. When the relay 33 is energized to swing the framework 26 away from shaft 21 the finger 47 is swung toward the shaft and into the path of a pin 48 extending from the shaft. This stops the shaft in exactly the same position each time and this position is preferably such that the screw 30 is in alinement with the thread on the shaft. Consequently no error in the demand interval occurs which might otherwise occur due to various positions of the thread opposite the screw 30 at the beginning of the demand intervals. This momentary stopping of the shaft does no harm to the motor which is also momentarily stopped. If desired a friction drive might be provided between the motor and shaft if the stopping of the latter is undesirable for any reason.

The complete operation of the apparatus as thus arranged will now be described. In Fig. 1 the relay 33 has just been deenergized and the demand carriage has been clutched to the shaft 21 and is ascending. Over the low pitch portion of the thread 23 the demand carriage rises relatively slowly, but ordinarily near the end of the demand interval it reaches the higher pitch portion 24 and ascends relatively faster. If the average speed of shaft 21 is faster than in the previous interval the demand carriage may reach the indicating carriage before the latter is released and carry it upward to make such a record as is indicated at 49, in which case nothing happens when the relay 37 is energized due to the contact made by 42 and 43. Shortly thereafter contact is made between 42 and 44, relay 33 is energized, framework 26 is swung away from shaft 21, the demand carriage drops to its initial position and shaft 21 is stopped in the meantime.

When relay 33 is deenergized, the shaft 21 is released and the demand carriage is clutched to the shaft simultaneously. If the average speed of shaft 21 is now slower than in the previous interval relay 37 will be energized before the demand carriage reaches the indicating carriage and the latter will drop, producing such a record as is indicated at 50. As the demand carriage rises it will carry the indicating carriage upward again to a position, such as is represented in Fig. 1, corresponding to the demand over the interval. If the demand is below that corresponding to the lower edge of the record sheet, it will not be recorded with the modification shown in Fig. 1 but a line such as represented at 51 will be drawn. The pen stays in whatever position it is left at the end of the demand interval until approximately the end of the next demand interval thereby drawing the horizontal parts of the record and leaving a clear record of the various demands.

The arrangement shown in Fig. 1 is particularly adapted for measuring and recording frequency. When used for such purpose on a 60 cycle circuit the central heavy line of the chart may represent 60 cycles, the top line 65 cycles, and the bottom line 55 cycles. The demand interval is assumed to be two minutes. Then when the frequency is constant at 55 cycles the demand carriage will be raised the distance corresponding to the low pitch on the shaft 21 in two minutes so it will just reach the indicating carriage with the pen on the lower line during a demand interval. When the frequency is 60 cycles the demand carriage will position the recording carriage so as to record on the central line of the chart. Thus the distance between horizontal graduations on the chart represent one-half cycle difference. It is seen that the important part of the record is spread out so as to make it very clear due to the rapid movement of the demand carriage over the range between 55 and 65 cycles as compared to its movement below that range. This is done without sacrificing accuracy and without making the apparatus anywhere near as large as would be necessary to obtain a record of the same clearness over the whole demand period. Ordinarily the records which are below a predetermined demand are never used so that they may be advantageously dispensed with in order to greatly magnify and clarify the higher demand records in the manner explained.

Of course any demand below a predetermined amount may be recorded by extending the recording chart and the recording range downward below the expanded recording range as illustrated in Fig. 2. Here the recording range is divided into two parts by the graduation line 52 corresponding to the position of the pen when the demand carriage just reaches the higher pitch of the thread in the shaft 21. If the pitch ratio below and above this line is 1 to 10, each graduation above line 52 will correspond to one unit and a corresponding graduation below this line will correspond to 10 units. The same advantage of expanding the important portion of the record is retained and the lower records are also obtained on a standard record sheet. Such an arrangement is advantageous for recording power demands where a flat rate is charged if the demand does not exceed a predetermined amount and a higher schedule of rates is charged for demands above such predetermined amount. The motor shown at 22 will preferably be a self-starting synchronous motor for the frequency recorder represented in Fig. 1. However, it will be apparent that the shaft 21 may be rotated by any other kind of a motor and in accordance with the demand or other quantity to be recorded. An indicating scale 53 may be provided in front of the indicating carriage cooperating with a pointer 54 on the carriage to give indications corresponding to those which are recorded on the chart.

In accordance with the provisions of the patent statutes I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States is:—

1. A demand meter comprising means actuated in accordance with the demand to be measured, a demand element adapted to be driven by said actuating means over predetermined time intervals through suitable motion transmitting means, said motion transmitting means having different motion transmitting ratios for different parts of the operating range of said apparatus and an indicator controlled by said demand element.

2. A demand meter comprising means actuated in accordance with the demand to be measured, a demand element adapted to be driven by said actuating means over predetermined time intervals and to be returned to an initial position at the ends of such time intervals, motion transmitting means between said actuating means and demand means, said motion transmitting means having a relatively low motion transmitting ratio over an initial part of its operating range and a relatively high motion transmitting ratio over the remaining portion of its operating range and an indicator controlled by said demand element.

3. In a demand meter, a shaft adapted to be rotated in accordance with the demand to be measured, said shaft having a spiral thread cut therein, the pitch of which thread varies, a demand carriage movably mounted adjacent to said shaft, said carriage having a projection normally adapted to mesh with the thread in said shaft in such a way that when in mesh and the shaft is rotated the carriage is moved parallel to said shaft, and time controlled means for periodically unmeshing said parts, said carriage being arranged to return to an initial position when thus disengaged from said shaft.

4. In a demand meter, a threaded shaft adapted to be rotated in accordance with the demand to be measured, a demand carriage, biased toward an initial zero position, movbly mounted adjacent to said shaft, said carriage having a projection normally adapted to engage with the thread on said shaft in such a way that when the shaft is rotated the carriage is moved, time controlled means for periodically unmeshing said parts thereby allowing said carriage to return to its initial position, and means for stopping the rotation of said shaft in a predetermined rotative position when said carriage is being returned to its initial position.

5. In a demand meter, a spirally threaded shaft adapted to be rotated in accordance with the demand to be measured, a demand carriage biased toward an initial zero position, movably mounted adjacent to said shaft, said carriage having a projection normally adapted to engage with the thread in said shaft in such a way that rotation of said shaft causes movement of said carriage, time controlled means for momentarily disengaging said carriage from said shaft to allow the carriage to return to its initial position, and means operated with said disengaging operation for bringing said shaft to a stop with the thread therein in alignment with the projection on said carriage when the latter reaches its initial position.

6. A demand meter comprising a spirally threaded shaft adapted to be rotated in accordance with the demand to be measured, a demand carriage biased toward an initial position movably mounted adjacent said shaft, said carriage carrying a projection which normally engages with the thread in said shaft whereby rotation of said shaft moves said carriage, means for periodically disengaging said carriage from said shaft thereby allowing the carriage to return to its initial position, a demand indicator positioned by said demand carriage in accordance with the measured demand just before it is returned to its initial position, and means for retaining said demand indicator in such position for substantially the greater part of the subsequent demand interval until it is again positioned by said demand carriage at the end of such subsequent demand interval.

7. A demand meter comprising a vertical spirally threaded shaft adapted to be rotated in accordance with the demand to be measured, a demand carriage movably mounted adjacent to said shaft, said carriage having a projection normally engaging the thread in said shaft whereby rotation of said shaft moves said carriage upward, an indicating carriage movably mounted adjacent to the path of movement of said demand carriage, projections on said carriages whereby the indicating carriage may be moved upward by said demand carriage, both of said carriages being adapted to drop by gravity when released, means for normally holding said indicating carriage from dropping due to gravity without preventing its upward movement when moved by said demand carriage, and time controlled means for momentarily releasing said indicating carriage and shortly thereafter momentarily releasing said demand carriage at the end of each demand interval, whereby the indicating carriage is positioned by said demand carriage in accordance with the demand measurement.

8. In a demand meter, a member actuated in accordance with the demand to be measured, a periodically reset demand element, variable ratio motion transmitting means between said actuating member and demand element, said motion transmitting means being arranged to restrict the movement of said demand element over the initial portion of its operating range relative to its movement over the latter portion of its operating range.

9. A demand meter comprising a member actuated in accordance with the demand to be measured, a periodically reset demand carriage, variable ratio motion transmitting means between said actuating member and demand carriage for advancing the latter during demand intervals, arranged to expand the movement of said demand carriage over the latter portion of its operating range relative to its movement over the initial portion of its operating range, and means for indicating only the demand measurements which occur over the extended portion of the operating range of said demand carriage.

10. A demand meter comprising a member actuated in accordance with the demand to be measured, a periodically reset demand carriage, variable ratio motion transmitting means between said actuating means and demand carriage arranged to advance said demand carriage during demand intervals and to expand the movement of said demand carriage over a latter portion of its operating range as compared to its movement over an initial portion of its operating range, a normally stationary recording member, a chart upon which said recording member registers, a timing device for advancing said chart, means controlled jointly by said timing device and demand carriage for positioning said recording member in accordance with the measured demand above a predetermined amount at the end of each such demand interval, and means for immediately thereafter causing the return of said demand carriage to its initial position.

In witness whereof, I have hereunto set my hand this 5th day of June 1926.

FREDRICK S. MARCELLUS.

CERTIFICATE OF CORRECTION.

Patent No. 1,781,588.  Granted November 11, 1930, to

FREDRICK S. MARCELLUS.

It is hereby certified that error appears in the printed specification of the above numbered patent requiring correction as follows: Page 2, line 91, for the word "as" read is; page 4, line 111, claim 9, for "extended" read expanded; and that the said Letters Patent should be read with these corrections therein that the same may conform to the record of the case in the Patent Office.

Signed and sealed this 9th day of December, A. D. 1930.

(Seal)

M. J. Moore,
Acting Commissioner of Patents.